United States Patent Office 3,353,975
Patented Nov. 21, 1967

3,353,975
LOW DENSITY INSULATION BONDED WITH COLLOIDAL INORGANIC MATERIALS
Richard F. Shannon, Lancaster, Ohio, and Marshall C. Armstrong, Succasunna, N.J., assignors to Owens-Corning Fiberglas Corporation, a corporation of Delaware
No Drawing. Filed Aug. 15, 1966, Ser. No. 572,198
8 Claims. (Cl. 106—65)

ABSTRACT OF THE DISCLOSURE

Porous, lightweight, inorganic aggregates bonded together by an inorganic binder to produce a lightweight composite wherein tensile strength can be transferred through the particles of aggregates and the bonds connecting the same.

---

The present application is a continuation in part of application Ser. No. 247,350, filed Dec. 26, 1962, now abandoned.

The present invention relates to low density insulating materials and particularly to a material comprising expanded or cellular inorganic particles interbonded by colloidal alumina, colloidal silica or other inorganic binder.

Molded insulating elements having a density of less than 20 pounds per cubic foot have previously been prepared from expanded perlite particles, bonded into an integal mass by means of organic binders such as synthetic resins, e.g., polyvinyl alcohol, and/or inorganic binders such as montmorillonite clays, e.g., bentonite. If such inorganic binders are employed alone, they yield inferior strengths and susceptibility to moisture, which cause extensive damage during conventional handling, shipping, storage and installation. If instead, an organic binder is utilized, it may be completely decomposed by the high temperatures experienced during normal use, and thereby result in the complete disintegration of the element.

As a consequence, a compromise involving the utilization of a combination of organic and inorganic binders has been generally employed. In such a system, the organic binder provides low temperature or "green" strengths, while the inorganic binder is subsequently fired at the high temperatures experienced during the installation of the structure as an insulation member, to provide adequate strengths under such conditions. However, even after firing, conventional inorganic binders demonstrate a susceptibility to moisture, and prior to firing, during the "green phase" of the organic binder, the inorganic binder may be swollen or removed by moisture.

Accordingly, even the dual binder, or in fact any binder system containing conventional clay binders, is plagued by an extensive moisture absorption, swelling and disintegration problem. Such a condition leads to cracking or dissolution and consequent attrition of such products. In addition, the necessity for two binders diminishes the properties and increases the cost of the product, since the binder phase is a relatively high density and more costly phase, and increased binder quantities therefore increase the product density and cost.

While the moisture absorption problem may be overcome by initially heating the structure to temperatures in excess of 1000° F., this does not provide a satisfactory solution since the strengths of structures thus hardened, and deprived of the effect of the then decomposed organic binder, are greatly diminished and inadequate for normal handling, shipping or installation. Once installed, exposure to such temperatures is of less consequence due to the substantially static and impact free conditions which attend the utilization of these products.

Consequently, presently available insulating structures formed from expanded or cellular inorganic particles such as perlite, are possessed of one or more serious impediments such as moisture absorption and swelling, excessive friability, or high densities, and a diminished insulating value which result from the inferior properties of the binder phase.

It is an object of the present invention to provide a new and improved low density molded insulating structure which comprise expanded or cellular inorganic particles bonded with colloidal silica, alumina, clay or other inorganic binders.

A further object is the provision of strong molded inorganic structures of the above described type which are free from the hazards of moisture attack.

Another object is the provision of an admixture of expanded or cellular inorganic particles and a colloidal inorganic binder which may be formed at room temperature and thermally hardened at temperatures in the range of 250° to 500° F. to provide a strong highly porous molded structure which is free from the hazards of moisture attack, and from the necessity for a plurality of binder phases.

An additional object is the provision of new and improved methods for the preparation of the strong, moisture resistant, highly porous low density structures above described and which are capable of withstanding temperatures in the range of 1500°–2000° F.

The term "cellular inorganic particles," as used throughout the present specification and claims, is intended to connote particles having a bulk density of less than 20 pounds per cubic foot, and which are characterized by a discontinuous structure. Such a cellular or discontinuous nature may be the result of gaseous expansion to form voids within a normally continuous structure, a product of mechanical cellulation or frothing, or the result of the leaching, decomposition or dissolution of a portion of a continuous structure, as when soluble materials are dissolved and washed therefrom, or readily decomposible or combustible materials are decomposed or combusted under conditions which do not affect the remaining portion of the structure. In essence, such materials comprise discontinuous structures having voids which may be formed by various means.

The expanded inorganic material is preferably expanded perlite prepared from perlite rock which normally comprises 65 to 70% silica, 10 to 25% alumina and 2 to 5% water. The desirability of this material is the result of both its highly satisfactory bulk densities, e.g. 2 to 12 p.c.f, its excellent thermal K values, e.g. as low as 0.2–0.5 at an average mean temperature of 75° F., and its ideal compatability with an alumina or silica binder phase. To derive the expanded form, the previously described perlite rock is heated to its softening point, whereupon a fluffy, pumice-like, cellular expanded material is derived.

In addition to expanded perlite, the term "expanded or cellular inorganic particles" is intended to encompass and connote other expanded minerals such as expanded vermiculite, and other cellular, siliceous or inorganic compositions such as glass foam, clay beads, cellular pumice, expanded clay, cellular diatomite, etc. The preparation of expanded vermiculite is fully disclosed by U.S. 1,963,275, and the material may be described as the expanded form of vermiculite, i.e. volume increased from 5 to 25 times, which results when the latter mineral is heated to temperatures in the range of 2000° C. The mineral subjected to such thermal treatment, conventionally comprises a hydrated magnesium-iron silicate.

The glass foam particles referred to as alternate materials, comprise conventional foamed or cellular glass. Such particles are preferably subjected to a surface fusion or glazing, in order to reduce their porosity. In the event that such porosity is not diminished, excessive quantities of binder may be necessitated by the fact that the binder is absorbed within the particles, to serve no useful purpose and simultaneously increase the density.

For example, suitable foamed glass pellets may be made by crushing into small particles a glass made from a batch composition comprising:

| | Percent |
|---|---|
| $SiO_2$ | 60 |
| $Al_2O_3$ | 10 |
| CaO | 15 |
| MgO | 5 |
| $B_2O_3$ | 10 | adding 100 parts of the crushed glass particles to 5 parts of flake aluminum, 5 parts barytes, and 4 parts gypsum, mixing and grinding the ingredients in a ball mill, admixing 10% water, forming small pellets from the resultant paste, and heating the pellets at 2000° F., for two minutes. Other methods of glass foam preparation are disclosed by U.S. Patents 2,354,807, 2,480,672, 2,658,096, and 2,691,248. It should be noted that the above described foamed glass pellets are highly satisfactory at temperatures up to 1200° F. However, at higher temperatures it is preferable to convert the glass from an amorphous to a crystalline condition. This may be achieved through either a seeding agent or by thermal treatment. In the former case, a crystalline seeding agent such as rutile is added to the basic batch composition. When this approach is taken the pellets are also possessed of an improved thermal K (heat transmission) since the rutile is an opacifier which acts to curtail radiation. Alternatively, the foamed glass pellets, after the described formation, may be heated at 1500° F., for two hours, to transform them to a crystalline state. During the latter treatment, the pellets undergo substantial shrinkage.

In addition, hollow unicellular particles such as clay or glass beads may be utilized as the expanded or cellular inorganic particles, or may be combined with materials such as perlite and interbonded to yield the desired type of product.

The diameters of the cellular inorganic particles are preferably in the range of 0.0001 to 0.375 inch, depending upon the nature of the material. For example, glass foam pellets having a diameter as great as 0.50 inch may be satisfactorily employed although a diameter of 0.06 inch is preferred.

In the case of expanded perlite, particles having the following sieve characteristics are preferred.

| Sieve Size | Percent Perlite Retained on Screen | |
|---|---|---|
| | Maximum | Minimum |
| 20 | 5 | 0 |
| 50 | 65 | 45 |
| 100 | 95 | 75 |

In the case of expanded vermiculate, commercial grade #4 is preferred. The sieve characteristics of that grade are as follows:

| Sieve Size | Percent Perlite Retained on Screen | |
|---|---|---|
| | Maximum | Minimum |
| 16 | 5 | 0 |
| 30 | 65 | 15 |
| 50 | 98 | 60 |
| 100 | 100 | 90 |

The bulk density of the inorganic particles should be no more than 20 pounds per cubic foot, and preferably no more than 12 pounds per cubic foot, depending upon the availability of a specific material in varying densities. Optimally, the bulk density should be between 2–8 p.c.f., and in the case of expanded perlite 2–5 p.c.f. since the latter material is available in such densities.

While materials comprising a siliceous compound, or having a major siliceous component, are preferred as the continuous phase of the expanded or cellular inorganic particles, materials having a negligible siliceous content or no siliceous content are also suitable. Specifically, the inorganic material need only be capable of being rendered cellular, or occur naturally in a cellular state, and possess resistance to decomposition at temperatures in excess of 500° F. and preferably resistant to temperatures of between 1000 to 2000° F.

The structures derived by interbonding the previously described expanded or cellular inorganic particles with colloidal forms of silica, clay, alumina or other inorganic binder are desirably characterized by a freedom from the tendency to absorb moisture and undergo swelling. In addition, the attainment of a strongly bonded, integral structure may be realized at relatively low temperatures. Still further, structures of outstanding density and thermal insulating properties are achieved.

The binders employed in accordance with the invention comprise particulate materials having an average major dimension of no more than one micron. For example, in the case of colloidal silica a particle size of 250–1000 angstrom units is preferred.

When a colloidal system of silica is utilized it may be prepared by passing a colloidal solution of a relatively low concentration of sodium silicate, e.g. 5–10%, through an ion exchange column in the hydrogen form. Alternatively, commercially available colloidal silica systems such as "Ludox" or "Syton" may be employed.

As a colloidal alumina system, the commercial preparation "Baymal" may be utilized. This material comprises minute fibrils of boehmite alumina which forms slightly acidic colloidal sols when dispersed in water or polar solvents, and is disclosed by U.S. Patents 2,915,475 and 2,917,426. Other colloidal forms of alumina may also be employed, such as alpha or laminar alumina, gamma alumina, diaspore (alpha alumina monohydrate), gibbsite (gamma aluminum hydroxide), bayerite (alpha aluminum hydroxides), and the amorphous alumina gels. It should be noted that when boehmite alumina fibrils are employed as the binder, the starting material is transformed upon heating, from a dispersible to a nondispersible condition, and as curing temperatures are elevated the original boehmite crystal may evolve through gamma alumina, theta alumina, and alpha alumina phases, to ultimately become a dense, sintered form of alpha alumina. However, at the relatively moderate, pre-installation, treating temperatures of the invention, the alumina probably does not progress beyond the gamma alumina form.

In addition, the colloidal materials may be prepared in accordance with U.S. Patent 2,901,379, wherein an appropriate salt, e.g. aluminum sulphate, is converted to its corresponding oxide by means of the addition of ammonium hydroxide.

Alternatively, the colloidal binder may comprise colloidal alumina or silica fines which are leached or washed from clays. Such colloidal fines are not to be confused with colloidal clays which are plagued by the previously discussed moisture absorption problem. Such fines systems may also contain added colloidal forms of both alumina and silica.

The colloidal binder is essentially a dispersion of the colloidal particles of oxide in a liquid medium which is preferably water, but which may be other liquid media capable of being dried at suitable temperatures.

The materials of the present invention are what are called bonded aggregates in which tensile strength is transferred through the particles of aggregate and the bonds connecting the same, rather than through the binder surrounding the aggregate. Such structures are to be distinguished from light weight bonded aggregate mixtures, such as concrete, wherein tensile strength is transferred solely through the binder, and wherein the particles of aggregate function primarily as bulking agents or fillers. Compressive loads, of course, are transferred through the aggregate in both instances.

Because the strength of the materials of the present invention are dependent upon the sequential transfer of stress from one particle of aggregate to the other through the bonds therebetween, the bond strength achieved by the present invention is much more significant than is the bond in concretes and the like. The present invention is concerned with the improvement of the bond achieved between porous light weight aggregates and inorganic binders.

One of the difficulties involved in the production of high bond strength between porous light weight aggregates and inorganic cements arises from the fact that it is difficult to wet out the aggregate. The pores of the aggregate are filled with gases which are more or less trapped in place. Even when the binder wets out the surface of the porous aggregate, it will usually bridge over the air trapped in the pores, so that the binder only contacts the projecting ends of the walls separating the pores. The amount of binder-aggregate contact therefore is very small, even though the aggregate appears "wet out," and the resulting bond strength, therefore, is quite low. This is shown by the following example:

Example A

Twenty grams of dried perlite were dipped into a silica sol containing 30% by weight of solids. The silica sol used was purchased under the Du Pont trade name, HS Ludox. The excess Ludox was drained off of the perlite, and the Ludox coated perlite weighed 90 grams. The wetted perlite was then placed in a mold and compressed under approximately 5 pounds per square inch pressure and was dried in an oven at 350° F. After drying, the bonded perlite was removed from the mold in a single piece, but crumbled easily in one's fingers when squeezed.

By expensive procedures, it is possible to remove most of the air from the pores of the porous aggregate, and when this is done, the inorganic binders, particularly the sols, impregnate the pores and make the binder-aggregate structure too dense and too heavy for insulation materials. It might be expected that air can be flushed out of the pores of the light weight aggregate by means of water, and that the water logged aggregate can then be bonded together with a binder. This approach does no provide high strength structures as is shown in the following example:

Example B

Twenty grams of perlite were thoroughly stirred and soaked in water over night. The next morning the water was drained therefrom and the water logged perlite now weighed 80 grams. The wet perlite was dipped in Ludox and the excess Ludox was drained from the wet perlite. The material wetted with Ludox now weighed 129 grams. The Ludox wetted perlite was then placed in a mold and compressed under approximately 5 pounds per square inch pressure and dried in the oven at 350° F., as was Example A above. This material when thoroughly dried, could not be removed from the mold in one piece, and it crumbled as it was being removed from the mold.

According to the invention, it has been discovered that hydrolyzable organo-silanes normally used to provide water repellency will greatly improve the strength of the bond that is achieved between inorganic binders and porous inorganic aggregates, if they are positioned between the aggregate and the binder in a hydrolyzed and unpolymerized state. It has been discovered that the hydrolyzable organo-silanes must not remain hydrolyzed for more than a matter of minutes before contacted by the binder or inferior bond strengths will result. It is believed that the hydrolyzed organo-silanes, when allowed to remain in a hydrolyzed condition on the aggregate, form silicones which interfere with the attachment of the binder to the aggregate. The binders with which we are concerned are water sols or suspensions, and if silicones are formed, as above described, the silicones interfere with the wetting of the aggregate by the binder. By placing unhydrolyzed organo-silane in position on the surface of the aggregate, and then contacting the silane with binder before hydrolyzing the organo-silane, Si—O bonds are believed to be produced, both directly to the aggregate and to the inorganic binders. While the organo-silanes are in a hydrolyzed condition, and before they have had a chance to link up into Si—O—Si siloxane chains, the silica group is very active and is believed to be drawn down onto the side walls of the pores of the aggregate to increase the area over which a bond is produced. The organo portions of the silanes project into the pores and help to prevent impregnation of the pores by the binder. The hydrolyzed and now active Si groups of the silane, not only are attracted to the surface of the aggregate, but form Si—O linkages to the binder material, and so couple the binder to the surface of the aggregate. This result is not obtained if the hydrolyzable organo-silane is either mixed with the binder that is applied to the aggregate, or is applied to the aggregate as an aqueous solution that has been mixed for more than approximately 15 minutes at room temperature. If the organo-silane has been hydrolyzed for more than approximately 15 minutes, it will act as a water proofing material which, as stated above, interferes with the bond produced between the binder and aggregate.

The above is illustrated by the following examples:

Example 1

Twenty grams of perlite (concrete grade) were dipped in a Stoddard solvent solution containing 5% by weight of sodium methyl siliconate (Dow Corning 770 silicone). The solution was allowed to drain from the perlite. After it had stopped draining, the wetted perlite weighed 76 grams. The wetted perlite was then dipped into Ludox and allowed to drain, after which time it weighed 136 grams. The coated perlite was compressed under approximately 5 pounds per square inch pressure in a mold and oven dried at 350° F. This material had a strength more than three times greater than that of Example A given above.

It will be seen that the sodium methyl siliconate was in an unhydrolyzed condition before being contacted by the Ludox solution, and that water from the Ludox solution hydrolyzed the sodium methyl siliconate in situ while it was positioned between the binder and aggregate. Si—OH bonds of the siliconate formed Si—O—Si bonds to the perlite, since it is a siliceous material. The siliconate also formed Si—O—Si bonds to the Ludox since it is a siliceous material. The siliconate coated perlite became very sticky when wetted by the Ludox with the result that much of the binder adhered to the mixing and handling equipment. It is believed that this loss reduced the strength of the resulting material, and that strengths 4 or 5 times that of Example A above can be obtained.

Example 2

A 5% by weight solution of an organo-siloxane of the formula given below was made by stirring an appropriate weight of the organo-siloxane into water at room temperature. Immediately thereafter, 20 grams of expanded perlite (concrete grade) were added and allowed to soak for 5 minutes. The wetted perlite was removed, the excess solution drained therefrom, and the wetted perlite weighed 67 grams. Immediately thereafter, the wetted perlite was blended into Ludox and stirred for two minutes. The perlite was then removed and the excess Ludox drained therefrom.

The Ludox wetted material weighed 124 grams. This material was placed in a mold and compressed at about 5 pounds per square inch, and dried in an oven at 350° F. The material could be removed from the mold, but crumbled when thumb pressure was applied thereto and was considered to have a strength slightly more than the strength of the material of Example A above. The organo-silane used above had the following general formula:

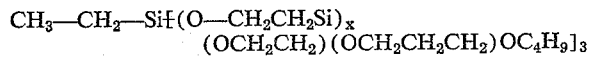

wherein the total of the three X's is approximately 20. This compound is an organo silicone formed by the reaction of 25% by weight of the silane with 75% by weight of a butoxy chain stopped polyol, and possesses a specific gravity of 1.03 at 25° C., and a viscosity of 900 centistokes at 77°F.

Example C

The procedure of Example 2 was repeated excepting that the perlite was allowed to soak in the 5% organo-silane water solution for 30 minutes instead of 5 minutes. This material crumbled in the mold and could not be removed therefrom without complete disintegration.

Example 3

The procedure of Example 2 was repeated excepting that the perlite was soaked in the organo-siloxane solution for 5 minutes and was washed several times under a water faucet before being dipped into the Ludox. This material was slightly stronger than that of Example 2 above, and had a strength approximately twice that of Example A. It is believed that the hydrolysis products of the organo-siloxane used, float to the surface of the silicone solution and interfere with the bonding of the Ludox. Washing these materials from the surface of the hydrolyzed organo-siloxane is believed to help improve the bond that is achieved to the Ludox.

Example 4

The procedure of Example 2 was repeated excepting that the perlite was dipped into a 2% by weight water solution of gammaamino-propyl trimethoxy silane instead of the organo-siloxane solution given in Example 2. After dipping in the solution the material weighed 79 grams, and after dipping in the Ludox, it weighed 123 grams. This material also had a strength approximately twice that of the material of Example A above.

The results of the present invention are not achieved when the organo-silane is mixed with the binder, instead of being applied to the aggregate and then contacted with the binder while the organo-silane is in a hydrolyzed condition.

Example D 1.8 grams of gammaaminopropyl trimethoxy silane was added to 44 grams of the Ludox material given above. 20 grams of perlite were stirred into the Ludox until completely wetted out. This material was then placed in a mold and compressed at approximately 5 pounds per square inch. The mixture was then dried in an oven at 350° F., and after drying, the sample completely crumbled and disintegrated when an attempt was made to remove it from the mold.

Example E 3.6 grams of the organo-siloxane given in Example 2 above were mixed with 43 grams of the Ludox material given above. 20 grams of perlite were added to the mixture, and stirring was continued until the perlite was completely wetted out. The mixture was placed in a mold compressed at 5 pounds per square inch, and dried in an oven at 350° F. This sample completely disintegrated when an attempt was made to remove it from the mold.

In compounding the basic mixture, the perlite may be admixed with a sol formed from the colloidal alumina or silica and additional water may be added to obtain the requisite consistency for molding. However, it is preferable that the amount of water added be no greater than 2.5 times the quantity of solids, in order to avoid unduly thin mixtures and a condition in which the volume of water exceeds the void space or interstitial volume existing between the particles. The mixture may be molded at room temperature, and removed from the mold and dried at temperatures of from 250–500° F. Since the binder phase is an inorganic material, temperatures in excess of 500° F. may be employed without detriment but are necessary. The prescribed heat treatment is preferably maintained until the structure is completely dry, in order to insure that the colloidal alumina or silica is not redispersed. Such heat treatment may entail from 1 to 8 hours, depending upon the temperature employed, the quantity of water present, and the nature of the cellular or expanded inorganic particles. Once the structure is dried, it may be allowed to return to equilibrium at room temperature. While substantially complete drying is desirable, it has been found that the retention of less than 10% moisture, and preferably less than 5% moisture, is not intolerable.

In addition, the "green strength" of the dried, but unheated structure may be greatly increased by carbonating the silica or alumina bond. This may also be achieved at room temperature by employing a perforate or foraminous mold and forcing carbon dioxide through the composite structure under vacuum. If such treatment is utilized, the cellular particle-binder composite should be moist or damp at the time of introduction, or contact with, the carbon dioxide.

It should be noted that drying at these relatively low temperatures yields products which are well bonded, and resistant to the effects of moisture. The latter property is amply evidenced by the fact that products prepared in accordance with the invention experience only a 30–40% loss of modulus after prolonged immersion in water, while similar products bonded with a colloidal clay such as bentonite, suffer a 75–80% decrease in modulus, and even complete disintegration, under the same conditions. It should also be noted that the moisture resistance of the inventive products is realized immediately subsequent to their formation and drying, without necessity for further treatment.

The proportions of ingredients, other than water, should fall within the following ranges:

| | Parts by weight |
|---|---|
| Expanded inorganic particles | 60–98 |
| Colloidal binder | 2–40 |

In addition, fibrous reinforcing material such as fibrous glass, siliceous, or mineral fibers, and asbestos in quantities of no more than 10% by weight, and having a length of no more than 3 inches, may be added to improve the product strengths. It is also possible to utilize other inorganic binders of the invention. For example, although conventional colloidal clays such as bentonite are unsatisfactory due to their moisture susceptibility, it has been found that such susceptibility is avoided or greatly diminished when such clays are employed in combination with the colloidal silica or colloidal alumina binders of the present invention. In addition to dispersing a fibrous reinforcing phase throughout the structure, high strength and impact resistant structures may also be prepared by affixing a random fibrous mat to one or both surfaces of the structure. For example, a mat composed of random, interbonded, fibrous glass strands, or asbestos paper, may be placed upon one face of the mold, the inventive admixtures poured thereupon, and the composite laminated during molding and hardening. Such methods serve to enhance the impact resistance of these relatively friable compositions.

As previously mentioned, the quantity of water added should be restricted to the amount necessary to allow complete and continuous coating of the particles and should not exceed a quantity equal to the void volume existing between the particles at the pre-determined density. Complete coating of the surfaces of the particles is extremely desirable in order to achieve a strong bond.

A preferred formulation exclusive of water, comprises the following ingredients, which are expressed in parts by weight:

*Example 5*

| | |
|---|---|
| Expanded perlite (density=2.5–3.5 p.c.f.) | 84 |
| Colloidal alumina (solids) | 12 |
| Chopped glass fibers | 3 |
| Silicone fluid | 0.2 |

In the above formulation, the colloidal alumina comprised "Baymal" or colloidal boehmite alumina, which was employed in the form of an aqueous sol (7% concentration), prepared by agitating the alumina and water for a period of 10 minutes. The glass fibers comprised segments of fibrous glass strands which were chopped to a length of no more than ¾ inch. The silicone fluid was the polysiloxane compound of Example 2 added as a water solution to the perlite immediately before mixing with the colloidal alumina.

The mixture of Example 5 was molded or shaped at room temperature and dried at 300° F. for 6 hours.

The products produced in accordance with the above examples yielded highly satisfactory strength and insulating values, and were characterized by outstanding moisture resistance, and suitably low densities, i.e. in the range of 11 to 15 p.c.f.

As previously discussed, the wet strength retention, or modulus, of the inventive products was greatly improved over similar products bonded with colloidal clay, i.e. bentonite. Still further, the thermal conductivity or K values of the inventive products were comparable to those of a clay bonded product having an equivalent density.

The organo-silanes which are useful in the practice of the present invention are silanes having two or three hydrolyzable groups, such as halogen, alkoxy, aryloxy, polyglycols having an ether linkage on the silicon, esters, etc. The organo-silane must be applied to the surface of the porous aggregate and be hydrolyzed without polymerization at the time it is contacted by the inorganic binder (silica sols, alumina sols, clays, phosphates, such as mono-aluminum phosphate, magnesium oxychlorides, magnesium oxysulfates, magnesium oxyphosphates, silicates, such as sodium borosilicate, and other inorganic binders having OH groups on their surface which will react with

radicals to split off water and form an —O—Si— bond). In addition some organo-silane can be added to the binder as a water proofing material etc., but it will not materially increase the bond strength between the aggregate and binder. It may also be possible to cheapen the product by adding clay or other secondary binders which are weakened by water to the primary binder, particularly when waterproofers are added to the binder. These additions do not, in general, detract from the bond achieved by the present invention, but may affect the strength of the binder. A particularly good binder is made by mixing from ⅒ to 3 parts by weight of solids of a silica sol with an acid phosphate salt of the type disclosed in U.S. Patent 2,479,504.

It is apparent that low density, high temperature inorganic insulating structures characterized by greatly improved integrity, and moisture resistance, and methods for making such structures, are provided by the present invention.

It is further obvious that various changes, alterations and substitutions may be made in the methods and materials of the present invention without departing from the spirit of the invention, as is defined by the following claims:

We claim:

1. A method of producing a strong light weight porous article of bonded porous aggregate, said method comprising: wetting from approximately 60 to 98 parts by weight of porous inorganic siliceous particles from the group consisting of expanded perlite, expanded vermiculite, glass foam, clay beads, cellular pumice, expanded clay, and cellular diatomite with a liquid bath of a material from the group consisting of hydrolzed unpolymerized organo silanes and hydrolyzable unpolymerized organo silanes, coating the organo silane wetted particles with from approximately 2 to approximately 40 parts by weight of an inorganic binder dispersed in water while the organo silane is in a substantially nonpolymerized condition, said binder being selected from the group consisting of silica sols, alumina sols, mono-aluminum phosphate, magnesium oxychlorides, magnesium oxysulfates, magnesium oxyphosphates, and sodium borosilicate, molding the coated porous inorganic siliceous particles into an article, and drying the molded article at a temperature above approximately 250° F.

2. The method of claim 1 wherein the inorganic binder is a silica sol.

3. The method of claim 2 wherein water is introduced into the pores of the aggregate before the aggregate is coated with silica sol.

4. The method of claim 1 wherein the organo-silane is applied to the aggregate as a solution in an organic solvent, and the organo-silane is hydrolyzed in situ by water in the inorganic binder.

5. The method of claim 1 wherein the aggregate is expanded perlite.

6. The method of claim 5 wherein the inorganic binder is a mono-aluminum phosphate.

7. The method of claim 1 wherein the binder is magnesium oxysulfate.

8. The method of claim 1 wherein the binder is a mixture of from ⅒ to 3 parts by weight of solids of a silica sol per part of an acid phosphate salt.

References Cited

UNITED STATES PATENTS

| | | | |
|---|---|---|---|
| 3,024,125 | 3/1962 | Lee | 106—84 |
| 3,203,813 | 8/1965 | Gajardo et al. | 106—40 |

TOBIAS E. LEVOW, *Primary Examiner.*

J. E. POER, *Assistant Examiner.*